United States Patent [19]

North

[11] Patent Number: 5,045,181
[45] Date of Patent: Sep. 3, 1991

[54] APPARATUS FOR REMOVING ASH FROM REPULPED WASTEPAPER

[75] Inventor: Merle W. North, Beloit, Wis.

[73] Assignee: Beloit Corporation, Beloit, Wis.

[21] Appl. No.: 404,247

[22] Filed: Sep. 7, 1989

[51] Int. Cl.$^5$ .................. B03B 7/00; B07B 1/10; B01D 33/04; D21B 1/32
[52] U.S. Cl. .................. 209/10; 162/4; 162/55; 209/17; 209/250; 209/272; 210/261; 210/393; 210/401
[58] Field of Search .......... 209/235, 250, 272, 307, 209/380, 10, 17; 162/4, 55; 210/261, 393, 400, 401

[56] References Cited

U.S. PATENT DOCUMENTS

| 4,501,662 | 2/1985 | Biondetti | 162/55 X |
| 4,557,826 | 12/1985 | Flucher et al. | 209/11 |
| 4,680,088 | 7/1987 | Bastanzuri | 162/4 |
| 4,722,793 | 2/1988 | Seifert et al. | 209/307 X |

FOREIGN PATENT DOCUMENTS

| 0623012 | 7/1961 | Canada | 209/629 |
| 0247844 | 12/1987 | European Pat. Off. | 209/307 |

Primary Examiner—Michael S. Huppert
Assistant Examiner—Edward M. Wacyra
Attorney, Agent, or Firm—Dirk J. Veneman; Raymond W. Campbell; David J. Archer

[57] ABSTRACT

An apparatus is disclosed for removing ash from repulped wastepaper which contains ash together with cellulosic fibers. The apparatus includes a frame and a plurality of rolls which are rotatably secured to the frame, such that the axes of rotation of the rolls are spaced and parallel to each other. The plurality of rolls include an upstream roll and a downstream roll having a cylindrical outer surface. A porous belt is supported by and extends around the plurality of rolls to define an endless loop. The belt moves between the upstream and downstream rolls for defining a screening portion. A headbox is disposed within the endless loop, and adjacent to the screening portion for ejecting the repulped wastepaper through the screening portion. A drainage device is disposed on the opposite side of the screening portion relative to the headbox for receiving ash passing through the screening portion. A shower is disposed adjacent to the cylindrical outer surface of the downstream roll for dislodging cellulosic fibers separated from the ash between the headbox and the downstream roll such that the fibers follow the cylindrical outer surface when the belt diverges relative to the outer surface. A doctor is disposed adjacent to the outer surface for doctoring the fibers from the outer surface of the downstream roll. A transverse conveyor is disposed adjacent to the outer surface for conveying the fibers transversely relative to the belt so that the fibers separated from the ash can be subsequently used for forming a reprocessed web.

12 Claims, 1 Drawing Sheet

APPARATUS FOR REMOVING ASH FROM REPULPED WASTEPAPER

BACKGROUND OF THE INVENTION

1. Field of the Invention

The present invention relates to an apparatus for removing ash from repulped wastepaper. More particularly, the present invention relates to an apparatus for removing ash from repulped wastepaper which contains ash together with cellulosic fibers.

2. Information Disclosure Statement

Paper and paperboard products are typically manufactured from a pulp stock ejected from a headbox onto a fourdrinier forming wire. Such pulp stock is produced by various processes which include cooking wood chips in a caustic liquor. The aforementioned chips are provided by a chipper, fed with logs cut from trees.

Accordingly, the production of paper has required the planting of many millions of acres of trees which are grown and harvested in order to supply the necessary logs.

More recently, greater interest has been shown in recycling wastepaper. Such recycling helps in the conservation of natural resources. Accordingly, wastepaper has been collected and transported to pulping mills for treatment to provide pulp suitable for the production of paper.

However, repulping of wastepaper of necessity includes removal of printing ink and coloring matter. Various processes for removing ink are commercially available, including ink flotation cells and the like. Nevertheless, the removal of ash from the wastepaper has proved to be difficult and expensive.

More particularly, ash or clay is a powdered additive added to the pulp or paper web during formation thereof or more usually in a subsequent coating operation. The clay is added to the paper web in order to enhance the printability of the surface thereof. However, when such wastepaper is repulped, the clay or ash tends to be evenly distributed throughout the repulped stock. Such clay tends to inhibit the required hydrobonding or adhesion between adjacent fibers within the subsequently formed web.

Consequently, it is necessary to remove such ash from the repulped wastepaper before such repulped stock is ejected from a headbox to form a reprocessed web.

The present invention provides an apparatus for removing such ash from repulped wastepaper which contains the aforementioned ash together with cellulosic fibers.

Therefore, it is a primary object of the present invention to provide an apparatus which overcomes the aforementioned inadequacies of the prior art apparatus, and to provide an apparatus and method which makes a considerable contribution to the art of repulping wastepaper.

Another object of the present invention is the provision of an apparatus which includes a porous belt which moves between an upstream and a downstream roll for defining a screening portion such that repulped wastepaper is ejected from a headbox through the screening portion so that ash passes through the screening portion and cellulosic fibers are retained by the screening portion.

Another object of the present invention is the provision of an apparatus for removing ash from repulped wastepaper which includes drainage means disposed on the opposite side of a screening portion relative to a headbox for receiving ash passing through the screening portion.

Another object of the present invention is the provision of an apparatus for removing ash which includes a shower disposed adjacent to a cylindrical outer surface of a downstream roll for dislodging cellulosic fibers separated from the ash between a headbox and the downstream roll such that the fibers follow the cylindrical outer surface when a belt supported by the roll diverges relative to the outer surface.

Another object of the present invention is the provision of an apparatus for removing ash which includes a doctor disposed adjacent to the outer surface of a downstream roll for doctoring fibers from the outer surface.

Another object of the present invention is the provision of an apparatus for removing ash in which the repulped wastepaper is ejected at an angle within the range 40-20 degrees relative to a screen portion, so that fibers within the repulped wastepaper are prevented from flowing through the screening portion while ash and the like passes through the screening portion to a drainage means.

Another object of the present invention is the provision of a saveall pan which defines a weir, the weir being disposed between an upstream roll and a headbox such that ash separated from the repulped wastepaper flows in a direction from the headbox towards a downstream roll while water separated from the repulped wastepaper flows over the weir in a direction opposite to the direction of flow of the ash.

Other objects and advantages of the present invention will be apparent to those skilled in the art by consideration of the detailed description contained hereinafter, taken in conjunction with the annexed drawings.

SUMMARY OF THE INVENTION

The present invention relates to an apparatus and method for removing ash from repulped wastepaper which contains ash together with cellulosic fibers.

The apparatus includes a frame and a plurality of rolls rotatably secured to the frame such that the axes of rotation of the rolls are spaced and parallel relative to each other.

The plurality of rolls include an upstream roll and a downstream roll having a cylindrical outer surface.

A porous belt is supported by and extends around the plurality rolls to define an endless loop.

The belt moves between the upstream and the downstream rolls for defining a screening portion, and a headbox is disposed within the endless loop and adjacent to the screening portion for ejecting the repulped wastepaper through the screening portion.

A drainage means is disposed on the opposite side of the screening portion relative to the headbox for receiving ash passing through the screening portion.

A shower is disposed adjacent to the cylindrical outer surface of the downstream roll for dislodging cellulosic fibers separated from the ash between the headbox and the downstream roll, such that the fibers follow the cylindrical outer surface when the belt diverges relative to the outer surface.

A doctor is disposed adjacent to the outer surface for doctoring the fibers from the outer surface of the downstream roll. A transverse conveyor which is disposed adjacent to the outer surface conveys the fibers transversely relative to the belt so that the fibers separated from the ash can be subsequently used for forming a reprocessed web.

In a more specific embodiment of the present invention the downstream roll has a diameter within the range 40 to 70 inches, and preferably within the range 55 to 65 inches.

The headbox is disposed at an angle relative to the screening portion such that the repulped wastepaper is ejected at an angle within the range 40 to 20 degrees relative to the screening portion and preferably within the range 35 to 25 degrees relative to the screening portion, so that fibers within the repulped wastepaper are prevented from flowing through the screening portion while ash and the like passes through the screening portion to the drainage means.

The drainage means includes a plurality of drainage foils with each foil of the plurality of foils being spaced along the direction of movement of the belt between the headbox and the downstream roll. Each of the foils supports the screening portion and assists separation of the ash from the fibers. Preferably, each of the foils extends transversely relative to the direction of movement of the belt.

A saveall pan is disposed beneath the screening portion for the collection of the ash separated from the repulped wastepaper. Preferably, the saveall pan defines a weir with the weir being disposed between the upstream roll and the headbox. The arrangement is such that ash separated from the repulped wastepaper flows in a direction from the headbox towards the downstream roll while water separated from the repulped wastepaper flows over the weir in a direction opposite to the direction of flow of the ash.

The doctor is disposed above the transverse conveyor such that fibers doctored from the outer surface of the downstream roll fall onto the transverse conveyor.

The present invention also includes a method for removing ash from repulped wastepaper which contains ash together with cellulosic fibers. The method includes the steps of:

(1) supporting a porous belt extending in an endless loop around a plurality of rolls;

(2) moving the belt between an upstream and downstream roll of the plurality of rolls such that the belt between the upstream and downstream roll defines a screening portion;

(3) ejecting the repulped wastepaper from a headbox disposed within the endless loop and adjacent to the screening portion such that the repulped wastepaper is ejected through the screening portion;

(4) receiving ash passing through the screening portion in a drainage device disposed on the opposite side of the screening portion relative to the headbox;

(5) showering the cylindrical outer surface of the downstream roll for dislodging cellulosic fibers separated from the ash between the headbox and the downstream roll such that the fibers follow the cylindrical outer surface when the belt diverges relative to the outer surface;

(6) doctoring the fibers from the outer surface of the downstream roll; and (7) conveying the fibers transversely relative to the belt so that the fibers separated from the ash can be subsequently used for forming a reprocessed web.

Many modifications and variations of the present invention will be readily apparent to those skilled in the art by consideration of the detailed description contained hereinafter taken in conjunction with the annexed drawings Such modifications and variations however fall within the spirit and scope of the present invention as defined by the appended claims.

DETAILED DESCRIPTION OF THE DRAWINGS

Figure 1:
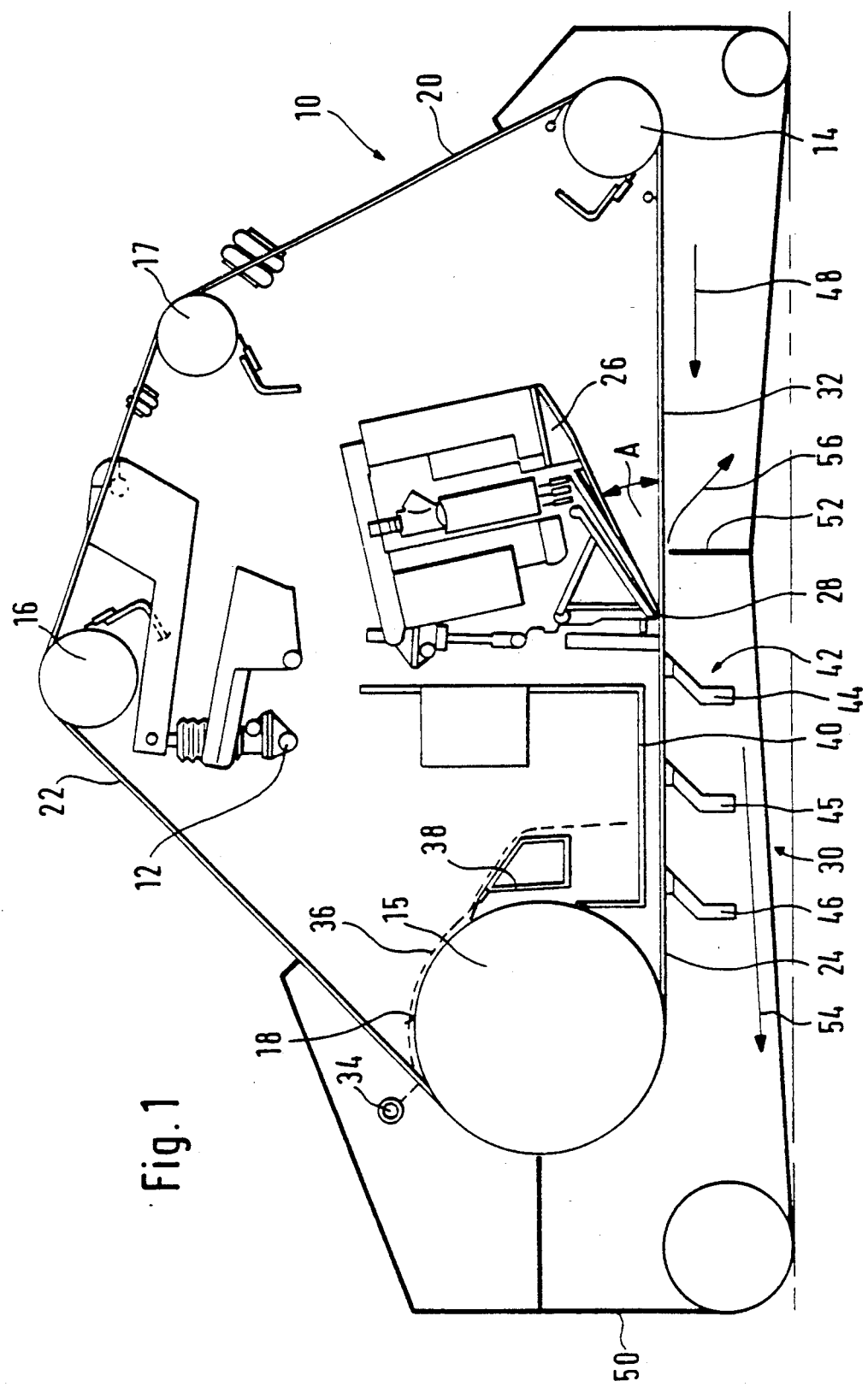
FIG. 1 is a side-elevational view of an apparatus for removing ash from repulped wastepaper according to the present invention.

FIG. 1 is a side-elevational view of apparatus generally designated 10 for removing ash from repulped wastepaper which contains ash together with cellulosic fibers.

The apparatus 10 includes a frame 12 and a plurality of rolls 14, 15, 16 and 17 rotatably secured to the frame 12 such that the axes of rotation of the plurality of rolls 14 to 17 are spaced and parallel relative to each other. The plurality of rolls 14 to 17 include an upstream roll 14 and a downstream roll 15 having a cylindrical outer surface 18.

A porous belt 20 is supported by and extends around the plurality of rolls 14 to 17 to define an endless loop 22. The belt 20 moves between the upstream and downstream rolls 14 and 15 respectively for defining a screening portion 24.

A headbox 26 is disposed within the endless loop 22 and adjacent to the screening portion 24 for ejecting repulped wastepaper 28 through the screening portion 24.

Drainage means generally designated 30 are disposed on the opposite side 32 of the screening portion 24 relative to the headbox 26 for receiving ash passing through the screening portion 24.

A shower 34 disposed adjacent to the cylindrical outer surface 18 of the downstream roll 15 dislodges cellulosic fibers 36 separated from the ash between the headbox 26 and the downstream roll 15 such that the fibers 36 follow the cylindrical outer surface 18 when the belt 20 diverges relative to the outer surface 18.

A doctor 38 is disposed adjacent to the outer surface 18 for doctoring the fibers 36 from the outer surface 18 of the downstream roll 15.

A transverse conveyor 40 is disposed adjacent to the outer surface 18 for conveying the fibers 36 transversely relative to the belt 20 so that the fibers 36 separated from the ash can be subsequently used for forming a reprocessed web.

The downstream roll 15 has a diameter within the range 40 to 70 inches and in a preferred embodiment has a diameter within the range 55 to 64 inches.

The headbox 26 is disposed at an angle relative to the screening portion 24 such that the repulped wastepaper 28 is ejected at an angle within the range 40 to 20 degrees relative to the screening portion 24.

In the preferred embodiment of the present invention, the repulped wastepaper ejected from the headbox 26 defines an angle A within the range 35 to 25 degrees relative to the screening portion 24 so that the fibers 36 within the repulped wastepaper 28 are prevented from flowing through the screening portion 24 while ash and the like passes through the screening portion 24 to the drainage means 30.

The drainage means 30 includes a plurality of drainage foils generally designated 42. Each foil 44, 45 and 46 of the plurality of foils 42 is spaced along the direction of movement, as indicated by the arrow 48 of the belt 20, between the headbox 26 and the downstream roll 15. Each of the foils 44 to 46 supports the screening portion 24 and assists separation of the ash from the fibers 36.

As shown in FIG. 1, each of the foils 44 to 46 extends transversely relative to the direction of the movement 48 of the belt 20.

The drainage means 30 also includes a saveall pan 50 which is disposed beneath the screening portion 24 for collecting the ash separated from the repulped wastepaper.

In a preferred embodiment of the present invention, as shown in FIG. 1, the saveall pan 50 defines a weir 52. The weir 52 is disposed between the upstream roll 14 and the headbox 26 such that ash separated from the repulped wastepaper flows in a direction as indicated by the arrow 54 from the headbox 26 towards the downstream roll 15, while water separated from the repulped wastepaper flows over the weir 52 in a direction as indicated by the arrow 56 opposite to the direction of flow 54 of the ash.

The doctor 38 is disposed above the transverse conveyor 40 such that fibers 36 doctored from the outer surface 18 of the downstream roll 15 fall onto the transverse conveyor 40.

In operation of the apparatus 10 for removing ash from repulped wastepaper, the repulped wastepaper is pumped into the headbox 26. The pressurized repulped wastepaper is ejected at an angle A from the headbox 26 downwardly towards the belt 20 which is moving in the direction as shown by the arrow 48. The screening portion 24 is supported by the foils 44 to 46 so that ash and water, and the like, passes through the screening portion 24 while cellulosic fibers are retained by the porous belt 20. The cellulosic fibers 36 extend between the downstream roll 15 and the belt 20. The shower 34 dislodges the fibers from the porous belt 20 such that the fibers 36 follow the outer surface 18 of the roll 15 as the outer surface 18 diverges relative to the belt 20. Such fibers 36 are doctored from the outer surface by a doctor 38 such that the fibers 36 fall into a transverse conveyor 40 for repulping and blending for subsequent use in forming a reprocessed web.

The present invention permits separation of ash or clay from the cellulosic fibers within repulped wastepaper, thereby permitting use of such cellulosic fibers in the production of a reprocessed web.

What is claimed is:

1. An apparatus for removing ash from repulped wastepaper which contains ash together with cellulosic fibers, said apparatus comprising:
   a frame;
   a plurality of rolls rotatably secured to said frame such that the axes of rotation of said rolls of said plurality of rolls are spaced and parallel relative to each other;
   said plurality of rolls including:
      an upstream roll;
      a downstream roll having a cylindrical outer surface;
   a porous belt supported by and extending around said plurality of rolls to define and endless loop;
   said belt moving between said upstream and downstream rolls for defining a screening portion;
   a headbox disposed within said endless loop and adjacent to said screening portion for ejecting the repulped wastepaper through said screening portion;
   drainage means disposed on the opposite side of said screening portion relative to said headbox for receiving ash passing through said screening portion;
   a shower disposed on the opposite side of said porous belt relative to said cylindrical outer surface for dislodging cellulosic fibers separated from the ash between said headbox and said downstream roll such that the fibers follow said cylindrical outer surface when said belt diverges relative to said outer surface;
   a doctor disposed on the opposite side of said porous belt relative to said shower for doctoring the fibers from said outer surface of said downstream roll;
   a transverse conveyor disposed adjacent to said outer surface for conveying the fibers transversely relative to said belt so that the fibers separated from the ash can be subsequently used for forming a reprocessed web.

2. An apparatus as set forth in claim 1 wherein said downstream roll has a diameter within the range 40–70 inches.

3. An apparatus as set forth in claim 1 wherein the downstream roll has a diameter within the range 55–65 inches.

4. An apparatus as set forth in claim 1 wherein said headbox is disposed at an angle relative to said screening portion such that the repulped wastepaper is ejected at an angle within the range 40–20 degrees relative to said screening portion.

5. An apparatus as set forth in claim 1 wherein said headbox is disposed at an angle relative to said screening portion such that the repulped wastepaper ejected from said headbox defines an angle within the range 35–25 degrees relative to said screening portion so that fibers within the repulped wastepaper are prevented from flowing through said screening portion while ash and the like passes through said screening portion to said drainage means.

6. An apparatus as set forth in claim 1 in which said drainage means further includes:
   a save-all pan disposed beneath said screening portion for collecting the ash separated from the repulped wastepaper.

7. An apparatus as set forth in claim 1 wherein said doctor is disposed above said transverse conveyor such that fibers doctored from said outer surface of said downstream roll fall onto said transverse conveyor.

8. An apparatus for removing ash from repulped wastepaper which contains ash together with cellulosic fibers, said apparatus comprising:
   a frame;
   a plurality of rolls rotatably secured to said frame such that the axes of rotation of said rolls of said plurality of rolls are spaced and parallel relative to each other;
   said plurality of rolls including:
      an upstream roll;
      a downstream roll having a cylindrical outer surface;
   a porous belt supported by and extending around said plurality of rolls to define and endless loop;
   said belt moving between said upstream and downstream rolls for defining a screening portion;
   a headbox disposed within said endless loop and adjacent to said screening portion for ejecting the repulped wastepaper through said screening portion;

drainage means disposed on the opposite side of said screening portion relative to said headbox for receiving ash passing through said screening portion;

a shower disposed adjacent to said cylindrical outer surface of said downstream roll for dislodging cellulosic fibers separated from the ash between said headbox and said downstream roll such that the fibers follow said cylindrical outer surface when said belt diverges relative to said outer surface;

a doctor disposed adjacent to said outer surface for doctoring the fibers from said outer surface of said downstream roll;

a transverse conveyor disposed adjacent to said outer surface for conveying the fibers transversely relative to said belt so that the fibers separated from the ash can be subsequently used for forming a reprocessed web; and said drainage means including:
a plurality of drainage foils, each foil of said plurality of foils being spaced along the direction of movement of said belt between said headbox and said downstream roll, each of said foils supporting said screening portion and assisting separation of the ash from the fibers.

9. An apparatus as set forth in claim 8 wherein each of said foils extends transversely relative to the direction of movement of said belt.

10. An apparatus for removing ash from repulped wastepaper which contains ash together with cellulosic fibers, said apparatus comprising:

a frame;
a plurality of rolls rotatably secured to said frame such that the axes of rotation of said rolls of said plurality of rolls are spaced and parallel relative to each other;
said plurality of rolls including:
an upstream roll;
a downstream roll having a cylindrical outer surface;
a porous belt supported by and extending around said plurality of rolls to define and endless loop;
said belt moving between said upstream and downstream rolls for defining a screening portion;
a headbox disposed within said endless loop and adjacent to said screening portion for ejecting the repulped wastepaper through said screening portion;
drainage means disposed on the opposite side of said screening portion relative to said headbox for receiving ash passing through said screening portion;
a shower disposed adjacent to said cylindrical outer surface of said downstream roll for dislodging cellulosic fibers separated from the ash between said headbox and said downstream roll such that the fibers follow said cylindrical outer surface when said belt diverges relative to said outer surface;
a doctor disposed adjacent to said outer surface for doctoring the fibers from said outer surface of said downstream roll;
a transverse conveyor disposed adjacent to said outer surface for conveying the fibers transversely relative to said belt so that the fibers separated from the ash can be subsequently used for forming a reprocessed web;
said drainage means further including:
a save-all pan disposed beneath said screening portion for collecting the ash separated from the repulped wastepaper; and
said save-all pan defining a weir;
said weir being disposed between said upstream roll and said headbox such that ash separated from the repulped wastepaper flows in a direction from said headbox towards said downstream roll while water separated from the repulped wastepaper flows over said weir in a direction opposite to the direction of flow of the ash.

11. An apparatus for removing ash from repulped wastepaper which contains ash together with cellulosic fibers, said apparatus comprising:

a frame;
a plurality of rolls rotatably secured to said frame such that the axes of rotation of said rolls of said plurality of rolls are spaced and parallel relative to each other;
said plurality of rolls including:
an upstream roll;
a downstream roll having a cylindrical outer surface;
a porous belt supported by and extending around said plurality of rolls to define an endless loop;
said belt moving between said upstream and downstream rolls for defining a screening portion;
a headbox disposed within said endless loop and adjacent to said screening portion for ejecting the repulped wastepaper through said screening portion;
drainage means disposed on the opposite side of said screening portion relative to said headbox for receiving ash passing through said screening portion;
said drainage means including:
a plurality of drainage foils, each foil of said plurality of foils being spaced along the direction of movement of said belt between said headbox and said downstream roll, each of said foils extending transversely relative to the direction of movement of said belt, each of said foils supporting said screening portion and assisting separation of the ash from the fibers;
a shower disposed adjacent to said cylindrical outer surface of said downstream roll for dislodging cellulosic fibers separated from the ash between said headbox and said downstream roll such that the fibers follow said cylindrical outer surface when said belt diverges relative to said outer surface;
a doctor disposed adjacent to said outer surface for doctoring the fibers from said outer surface of said downstream roll; and
a transverse conveyor disposed adjacent to said outer surface for conveying the fibers transversely relative to said belt so that the fibers separated from the ash can be subsequently used for forming a reprocessed web.

12. A method for removing ash from repulped wastepaper which contains ash together with cellulosic fibers, said method comprising the steps of:

supporting a porous belt extending in an endless loop around a plurality of rolls;
moving the belt between an upstream and downstream roll of the plurality of rolls such that the belt between the upstream and downstream roll defines a screening portion;
ejecting the repulped wastepaper from a headbox disposed within the endless loop and adjacent to the screening portion such that the repulped wastepaper is ejected through the screening portion;
receiving ash passing through the screening portion in a drainage device disposed on the opposite side of the screening portion relative to the headbox;

showering a cylindrical outer surface of the downstream roll for dislodging cellulosic fibers separated from the ash between the headbox and the downstream roll such that the fibers follow the cylindrical outer surface when the belt diverges relative to the outer surface, such showering being applied to the side of the belt opposite to the cylindrical outer surface of the downstream roll;

doctoring the fibers from the outer surface of the downstream roll, such doctoring being carried out on the opposite side of the belt relative to the showering of the outer surface; and conveying the fibers transversely relative to the belt so that the fibers separated from the ash can be subsequently used for forming a reprocessed web.

* * * * *

UNITED STATES PATENT AND TRADEMARK OFFICE
CERTIFICATE OF CORRECTION

PATENT NO. : 5,045,181
DATED : September 3, 1991
INVENTOR(S) : Merle W. North

It is certified that error appears in the above—identified patent and that said Letters Patent is hereby corrected as shown below:

Column 5, Line 63: Please delete "and" and insert therefor --an--.

Column 6, Line 13: Please insert --and-- after "roll;".

Column 6, Line 63: Please delete "and" and insert therefor --an--.

Column 7, Line 41: Please delete "and" and insert therefor --an--.

Signed and Sealed this

Nineteenth Day of January, 1993

Attest:

DOUGLAS B. COMER

*Attesting Officer*    Acting Commissioner of Patents and Trademarks